United States Patent [19]

Cucinella et al.

[11] 3,901,862

[45] Aug. 26, 1975

[54] PROCESS FOR THE PREPARATION OF ETHYLENE-BUTADIENE COPOLYMERS

[75] Inventors: Salvatore Cucinella; Alessandro Mazzei, both of San Donato Milanese, Italy

[73] Assignee: Snam Progetti S.p.A., San Donato Milanese, Italy

[22] Filed: Dec. 14, 1973

[21] Appl. No.: 424,718

[30] Foreign Application Priority Data
Dec. 20, 1972 Italy................................. 33277/72
Oct. 16, 1973 Italy................................. 30155/73

[52] U.S. Cl....................... 260/85.3 R; 260/94.9 E
[51] Int. Cl.......................... C08d 3/06; C08f 15/04
[58] Field of Search.................. 260/85.3 R, 94.9 E

[56] References Cited
UNITED STATES PATENTS

| 3,148,176 | 9/1964 | Juveland et al. | 260/85.3 R |
|---|---|---|---|
| 3,386,975 | 6/1968 | Marconi et al. | 260/94.9 CA |
| 3,553,287 | 1/1971 | Delbouille et al. | 260/85.3 R |
| 3,723,348 | 3/1973 | Apothcker et al. | 260/94.9 CA |
| 3,766,155 | 10/1973 | Matsushima et al. | 260/85.3 R |
| 3,781,318 | 12/1973 | Corbellini et al. | 260/85.3 R |
| 3,803,106 | 4/1974 | Hayashi et al. | 260/85.3 R |

FOREIGN PATENTS OR APPLICATIONS

| 1,032,265 | 6/1966 | United Kingdom | 260/85.3 |
|---|---|---|---|
| 1,131,257 | 10/1968 | United Kingdom | |
| 1,131,258 | 10/1968 | United Kingdom | |
| 1,131,259 | 10/1968 | United Kingdom | |
| 1,131,260 | 10/1968 | United Kingdom | |

*Primary Examiner*—Joseph L. Schofer
*Assistant Examiner*—A. Holler
*Attorney, Agent, or Firm*—Ralph M. Watson, Esq.

[57] ABSTRACT

Ethylene and butadiene are copolymerized in the presence of a ternary catalyst system consisting of: (a) vanadium or vanadyl chloride; (b) an aluminum compound represented by the formula: Al $R_xX_{3-x}$, wherein R is alkyl, aryl, alicyclic or hydrogen, X is a halogen and $1 \leq x \leq 2$; and (c) is an aluminum compound containing aluminum-nitrogen bonds, such as aluminum tris-dialkyl amide.

7 Claims, No Drawings

PROCESS FOR THE PREPARATION OF ETHYLENE-BUTADIENE COPOLYMERS

The present invention relates to a process for the preparation of ethylene-butadiene copolymers by means of ternary catalysts constituted of vanadium halides, aluminum compounds containing aluminum-nitrogen bonds and aluminum alkyl-halides.

It is known that systems of the Ziegler type are not suitable for such a copolymerization because of the fact that mixtures of two homopolymers or very low molecular weight copolymers are obtained, which show an insufficiently homogeneous composition or an unsaturation distribution which does not allow an effective cross-linking with sulphur.

It is also known that polyethylene, when it is cross-linked, shows significant improvements in its chemical-physical properties which allow a wider use thereof.

Those skilled in the art know that cross-linking improves the crazing strength under load in the presence of surface active agents, the impact and heat strength of the manufactured articles.

Furthermore cross-linking is useful in order to obtain foamed materials at very low density, thermoshrinkable films, etc. The processes, which are usually employed for cross-linking polyethylene, are based on the use of penetrating radiations or of organic peroxides.

However the first process requires very expensive apparatus whereas the second one has the disadvantages due to the employment of very reactive substances which, moreover, have a difficultly controllable decomposition kinetic.

The difficulties associated with polyethylene cross-linking may be overcome by employing the copolymers which are the subject of the present invention, which may be cross-linked by sulphur and accelerator systems that have been employed in the vulcanization of the usual elastomers.

In this case the cross-linking process is easily controllable and can be adapted to a convenient technology.

The process of the present invention makes it possible to obtain copolymers having high molecular weight, high crystallinity of the polyethylene type with low butadiene content and which are cross-linkable by vulcanization with sulphur base recipes, through catalysts constituted by:

a. vanadium or vanadyl halide-derivatives;
b. an aluminum compound of the $AIR_rX_{3-r}$ type wherein R is an alkyl, aryl or cycloalkyl radical or a hydrogen atom, X is a halogen and $1 \leq X \leq 2$;
c. an aluminum compound containing aluminum-nitrogen bonds selected from the following ones:
   — aluminum-triamides having the general formula $Al(NR_2)_3$ wherein R has the aforesaid meaning;
   — $AlH_x(NR_2)_{3-x}$ wherein R and $x$ have the aforesaid meanings;
   — aluminum polymeric compounds having the formula

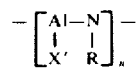

wherein R is a hydrocarbon radical selected from the aforementioned ones, X' may be hydrogen or halogen; the halogen atom number may be 0 or is lower than $n$, the balance to $n$ being constituted by hydrogen atoms; $n$ is from 2 to 50 and preferably from 3 to 12.

The components of the catalytic system are employed at an Al—N containing compound/vanadium compound ratio higher than 0.1 whereas the ratio between the aluminum alkyl-halide moles and the vanadium moles is higher than 0.5

The best results are obtained when the molar ratio between the Al—N containing compound and the vanadium compound ranges from 0.5 to 3 whereas the ratio between the aluminum alkyl-halide derivative and the vanadium compound ranges from 2 to 12.

The catalyst may be preformed or prepared in the presence of both monomers. The copolymerization is carried out in the presence of a solvent which may consist of an aliphatic, aromatic or alicyclic hydrocarbon, at a pressure ranging from 1 to 150 $Kg/cm^2$, due to ethylene and to hydrogen eventually fed as molecular weight regulator.

The reaction temperature ranges from $-30°$ to $+150°C$.

At the end of the reaction the copolymer may be recovered according to usual methods, by removing the solvent and drying in the presence of suitable antioxidants. The monomers may be introduced together, at the wanted ratios, at the beginning of the reaction; however it is advantageously added before the fixed butadiene amount and then to send ethylene at a constant pressure for all the wanted polymerization time, or to feed such a monomers mixture that the composition in the polymerization reactor shall be constant during the course of the polymerization. It is preferable that the catalyst components be mixed in the presence of both monomers.

According to the starting mixture of monomers, copolymers are obtained containing butadiene in amounts ranging from 0.1 to 95%.

The butadiene units in the copolymer are in the 1,4 trans configuration, or partially show an 1,2 configuration close to the 1,4 trans one, this latter being however the prevailing one.

When no use is made of regulating agents, the copolymer molecular weights are usually high and, therefore, the intrinsic viscosity, determined in decaline at 135°C, may vary up to 10; by changing the copolymerization conditions it is possible to regulate the molecular weight also to viscosity values lower than 1.

Generally the obtained copolymers are completely soluble in hydrocarbon solvents having a boiling point near to the polyethylene melting point, according to the absence of gel before the sulphur base vulcanization.

The composition of the copolymers containing up to 20% butadiene by moles is generally calculated from calibration curves obtained by correlating NMR analysis results and IR band intensities. Particular use is made of relations between the content of trans 1,4 butadiene unities and the values of the ratios $D_{10.35\mu}/D_{13.90\mu}$ or $D_{10.35\mu}/D_{2.30\mu}$ as reported in "Chimica e Industria 53 (1971)."

The $D_{11\mu}/D_{10.35\mu}$ is moreover measured for determining the butadiene unities in 1,2 configuration.

When studying copolymers having a butadiene amount equal to or higher than 20% by moles, use is made of the direct NMR analysis.

The X-ray examination of the copolymers at high ethylene content (>95%) shows the presence of crystallinity of polyethylene type higher than 70% while there is no crystallinity attributable to butadiene sequences.

The cross-linking of the ethylene-butadiene copolymers, which easily occurs also on products having a low butadiene content ( ≤ 10% by moles), is measured by the gel percentage caused by the vulcanization.

The gel percentage is determined by subjecting the copolymer, before and after the vulcanization, to a continuous extraction with boiling xylene in a Kumagawa extractor.

The low butadiene content copolymers, besides having unchanged the peculiar and good properties of polyethylene homopolymer after cross-linking with sulphur, contemporaneously show a higher thermal resistance.

Also the crazing under load strength increases in the presence of surface active agent, and also the impact resistance.

The so obtained copolymers are of peculiar importance in fields wherein use is now made of more expensive materials, such as the coating of cables for special uses, pipes for hot liquids, and generally materials having a particular resistance to solvents or vapours at high temperature, in the automotive industry and others.

Moreover these copolymers can be employed for the production of difunctional ethylene oligomers by utilizing oxidative reactions which, by etching the double bond, may give rise to oligomers having oxygen containing functions as end groups. Such oligomers may be employed for polycondensation reaction or other purposes.

The following examples illustrate the invention, but they are not limitative thereof.

EXAMPLE 1

Use was made of a stainless steel autoclave having 1 l capacity, equipped with an anchor magnetic stirrer and held at 17°C by a liquid circulating through the external cooling jacket, from which air was removed; therein a solution of ml 400 of toluene containing 1 mmole of $VOCl_3$ and 1 mmole of $Al(NMe_2)_3$ was introduced (the two components were previously added as aforesaid and reacted for 5 minutes at room temperature). 4 g of butadiene and 18 Kg/cm² of $H_2$ were then introduced into the autoclave. It was saturated with ethylene to 25.5 Kg/cm² and finally 8 mmoles of $AlEtCl_2$ were introduced, dissolved in 20 ml of toluene, by means of an ethylene pressure regulated at 26 Kg/cm².

The polymerization started at once, as emphasized by a gradual increase in the temperature of about 8°C; having reached the value of 25°C after about 10 minutes from the start of the reaction, the temperature slowly fell again to 17°C.

During the polymerization run the autoclave pressure was maintained constant by a connection to the ethylene feed cylinder. After 1 hour the gas was rapidly discharged and 20 cc of a toluene solution at 30% piperidine, to which an antioxidant had been added, were added to the polymerization mixture followed by an excess of methyl alcohol. The copolymer was recovered by filtering the suspension, washed by an alcohol to which an antioxidant had been added and dried at 50°C under vacuum. The yield was 54 grams. The [η] value, determined at 135°C in decaline was 3.6. The I.R. analysis showed that the $D_{10.35\mu}$ /$D_{13.90\mu}$ ratio was 0.36; $D_{10.35\mu}$ means the optical density of an absorption band typical of 1,4 trans enchainment of butadiene polymeric unities, whereas $D_{13.90\mu}$ means the optical density of a band typical of polymethylene sequences; the absorptions of butadiene enchainment of vinyl type were insignificant. The X-ray examination showed a crustallinity of 82%. The copolymer was cross-linkable with sulphur as it resulted from continuous extraction tests performed with boiling xylene in a Kumagawa extractor, which were carried out respectively on a copolymer sample as such and on a copolymer sample previously treated with a sulphur base recipe. In the first case the product was entirely extractable, while in the second one, 89% of the product was insoluble. The sulphur treatment consisted of a pressing at 180°C for half an hour according to the following recipe:

| | |
|---|---|
| Copolymer | 100 |
| Antioxidant 2246 | 1 |
| Zinc Oxide | 5 |
| Stearic Acid | 1 |
| NOBS special | 2.5 |
| Vulkacit DM | 0.5 |
| Sulphur | 1.5 |

To obtain a proper comparison, the sample which was not subjected to the sulphur treatment was pressed for half an hour at 180°C before being extracted with xylene.

EXAMPLES 2-13

By working according to example 1, some copolymerization tests were carried out.

The conditions and the results are reported in table 1.

TABLE 1

| Ex. No. | Reaction vessel | Monomers | $H_2$ Kg/cm² | Toluene ml | Catalyst Type | Catalyst mmoles | Cocatalyst Type | Cocatalyst mmoles | Reaction T°C | Reaction time (min.) | Yield g | Copolymer I.R. Examen $D_{10.35\mu}/D_{13.90\mu}$ | 135°C [η] dec. | % Boiling Extract N.T. (*) | Xilene T (**) | RX Examen Cristallinity % |
|---|---|---|---|---|---|---|---|---|---|---|---|---|---|---|---|---|
| 2 | Autoclave ht. 2 | but. g 15 et. 8 Kg/cm² | 18 | 600 | $VOCl_3$ Al(NMe$_2$)$_3$ | 1 1 | AlEt-Cl$_2$ | 8 | 17+20 | 60 | 25 | 0.42 | 3.19 | 1.2 | 79 | 86 |
| 3 | Autoclave lt. 1 | but. g 10 et. 8 Kg/cm² | 10 | 400 | $VOCl_3$ | 1 | AlEt-Cl$_2$ | 9 | 17+31 | 60 | 32.5 | 0.21 | n.d. | 24 | 33.6 | n.d. |
| 4 | Auto- | but. | 22 | 400 | VO | 1 | AlEt- | 10 | 17+39 | 60 | 34 | 0.03 | 1.42 | 0 | 0 | n.d. |

TABLE 1-continued

| Ex. No. | Reaction vessel | Monomers | H₂ Kg/cm² | Toluene ml | Catalyst Type | mmoles | Cocatalyst Type | mmoles | T°C | Reaction time (min.) | Yield g | I.R. Examen $D_{10.35\mu}$ $D_{13.10\mu}$ | 135°C [η] dec. | % Boiling Extract N.T. (*) | Xilene T (**) | RX Examen Crystallinity % |
|---|---|---|---|---|---|---|---|---|---|---|---|---|---|---|---|---|
| | clave lt. 1 | g 5 et. 8 Kg/cm² | | | Cl₃ Al (NMe₂)₃ | 0 | Cl₂ | | | | | | | | | |
| 5 | Autoclave lt. 1 | but. g 5 et. 8 Kg/cm² | 22 | 400 | VO Cl₃ Al (NMe₂)₃ | 1 0.33 | AlEt-Cl₂ | 10 | 17+39 | 60 | 45 | 0.09 | 1.87 | 0.1 | 3.4 | n.d. |
| 6 | Autoclave lt. 1 | but. g 5 et. 8 Kg/cm² | 22 | 400 | VO Cl₃ Al (NMe₂)₃ | 1 1 | AlEt-Cl₂ | 10 | 16+20 | 60 | 42 | 0.28 | 2.54 | 0.3 | 72 | n.d. |
| 7 | Autoclave lt. 1 | but. g 5 et. 8 Kg/cm² | 22 | 400 | VO Cl₃ Al (NMe₂)₃ | 1 3 | AlEt-Cl₂ | 12 | 16 | 60 | 14.5 | 0.24 | 3.06 | 0.2 | 73 | n.d. |
| 8 | Autoclave lt. 1 | but. g 10 et. 8 Kg/cm² | 10 | 400 | V Cl₄ | 1.5 | AlEt-Cl₂ | 4.5 | 16+23 | 60 | 22.7 | 0.21 | 2.18 | 0 | 15 | n.d. |
| 9 | Autoclave lt. 1 | but. g 20 et. 8 Kg/cm² | 10 | 400 | V Cl₄ | 1 | AlEt-Cl₂ | 3 | 17+19 | 60 | 6 | 0.75 | n.d. | — | — | n.d. |
| 10 | Autoclave lt. 1 | but. g 10 et. 18 Kg/cm² | 10 | 400 | V Cl₄ Al (NMe₂)₃ | 1.5 1 | AlEt-Cl₂ | 4.5 | 16+25 | 60 | 20.8 | 0.25 | 2.89 | 0 | 68 | n.d. |
| 11 | Autoclave lt. 1 | but. g 20 et. 18 Kg/cm² | | 400 | V Cl₄ Al (NMe₂)₃ | 1.5 1 | AlEt-Cl₂ | 4.5 | 17+28 | 60 | 45 | 0.39 | 3.61 | 0 | 50 | 82 |
| 12 | Autoclave lt. 2 | but. g 20 et. 8.5 Kg/cm² | 13 | 1200 | V Cl₄ Al (NMe₂)₃ | 3 2 | AlEt-Cl₂ | 9 | 18+20 | 60 | 43 | 0.62 | 1.99 | 0 | 71 | 85 |
| 13 | Autoclave lt. 2 | but. g 20 et. 18 Kg/cm² | | 400 | V Cl₄ Al (NMe₂)₃ | 1.5 1 | AlEt-Cl₂ | 4.5 | 19+21 | 60 | 37 | 1.04 | 9.67 | 0.3 | 57 | 85 |

N.T. (*) It was not treated by sulphur base recipes
T. (**) It was treated by sulphur base recipes
n.d. It was not determined.

By examining examples 4, 5 and 6 it is possible to note that, the other conditions being the same, the addition of increasing amounts of aluminum triamide to the $OVCl_3$ + $AlEtCl_2$ mixture produces a butadiene increase in the resulting copolymer, products being obtained which are cross-linkable with sulphur.

On the other hand the comparison between two copolymers having almost the same composition, respectively obtained without or with aluminum triamide, emphasizes that the former copolymer shows a cross-linking before the sulphur base treatment (partial solubility at boiling xylene extraction, ex. 3) and then it is little cross-linked by sulphur whereas the latter one (ex. 6) is completely soluble at boiling xylene extraction, in spite of a little increase of the butadiene content and has 72% gel after the treatment with sulphur base recipes.

By comparing the example 8 with the example 10 it will be noted that, when use is made of $VCl_4$ base systems, the addition of the third component clearly improves the cross-linking with sulphur; moreover the study of the examples confirms that the addition of $Al(NMe_2)_3$ emphasizes the activity with regard to butadiene.

Moreover an increase of the butadiene content in the product obtained without aluminum amide causes the formation of gel, which does not allow the mix thereof with the vulcanization ingredients.

EXAMPLES 14–17

According to what has been pointed out above, copolymerizations were carried out with higher butadiene amounts.

In such a way it is possible to obtain copolymers having a prevailing butadiene content.

The working conditions and the results are reported in table 2.

TABLE 2

| Ex. No. | Vessel | Monomers | $H_2$ Kg/cm² | Toluene ml | Catalyst | Co-catalyst | Temp. °C | Time | Yield | | Butadiene % by moles |
|---|---|---|---|---|---|---|---|---|---|---|---|
| 14 | Autoclave lt. 1 | BTD g 12 Etilene Kg/cm² 8 | 16 | 400 | OVCl₃ mmole 1 Al(NMe₂)₃ mmole 1 | AlEtCl₂ mmoles 9 | 16+18 | 1 h | 25.5 | — | 20(*) |
| 15 | Autoclave lt. 1 | BTD g 24 Etilene Kg/cm² 8 | 16 | 400 | idem | idem | 16 | 1 h | 20 | — | 40(*) |
| 16 | Autoclave lt. 1 | BTD g 32 Etilene Kg/cm² 8 | 20 | 400 | idem | idem | 16 | 1 h | 23.5 | — | 67(*) |
| 17 | Autoclave lt. 1 | BTD g 12 Etilene Kg/cm² 8 | 16 | 400 | idem | idem | 16+18 | 1 h | 25 | — | 8.9 |

(*)Determined by NMR way.

EXAMPLES 18–25

Use was made of a stainless steel autoclave having 1 l capacity, equipped with an anchor magnetic stirrer and held at 16°C by a liquid circulating through the external cooling jacket, and from which air was removed,; therein we introduced a solution of ml 400 of toluene containing 1 mmole of VOCl₃ and variable amounts of the aluminium compounds having Al—N bonds (the two components were previous added as aforesaid and reacted for 5 minutes at room temperature).

Then 5 g of butadiene and 22 Kg/cm² of $H_2$ were introduced into the autoclave.

An ethylene stream was then fed up to a pressure slightly lower than that of saturation and, finally, 8 mmoles of AlEtCl₂ were introduced, after having been dissolved in 20 ml. of toluene, by an ethylene pressure. The polymerization started at once as shown by a gradual increase of the temperature, which then slowly lowered to the starting value. The recovery of the polymer, the analysis and the vulcanization thereof were carried out as in the first example.

The results are reported in table 3.

TABLE 3

Ethylene-butadiene copolymerization test by employing ternary catalyst systems: OVCl₃ — AlEtCl₂ AlR$_x$ (NR₂)$_{3-x}$ (Autoclave 1 l toluene ml 400; C₂H₄ 8 Kg/cm², H₂ 22 Kg/cm², butadiene g 5; time 60')

| Test | OVCl₃ mmoles | Catalyst Amminoalane Type | mmoles | AlEtCl₂ mmoles | T°C | g | I.R. analysis $D_{10.35\mu}/D_{13.90\mu}$ | Polymers (*) [η] | N.V. | % gel(**) V. |
|---|---|---|---|---|---|---|---|---|---|---|
| 18 | 1 | — | — | 8 | 16+33 | 42.5 | 0.064 | 1.77 | 0 | 0 |
| 19 | 1 | AlH(NMe)₂)₂ | 0.5 | 8 | 16+30 | 47 | 0.11 | 2.34 | 0.1 | 6 |
| 20 | 1 | AlH(NMe)₂)₂ | 1 | 8 | 16+20 | 37 | 0.21 | 3.73 | 0.1 | 41 |
| 21 | 1 | AlH(NMe)₂)₂ | 1.5 | 8 | 16+23 | 45 | 0.37 | 3.15 | 0.2 | 33 |
| 22 | 1 | AlH(NMe)₂)₂ | 2 | 8 | 16+22 | 46 | 0.33 | 4.70 | it does not melt | — |
| 23 | 1 | AlH(NMe)₂)₂ | 3 | 8 | 16+17 | 20 | 0.46 | 3.24 | it does not melt | — |
| 24 | 1 | AlH(NMe)₂)₂ | 1 | 0 | 16 | 0 | — | — | — | — |
| 25 | 1 | AlH₂NMe₂ | 2 | 8 | 16 | 5 | 0.34 | 3.49 | — | — |

(*) Determination in decaline at 135°C
(**)Cross-linking tests by sulphur base recipes: N.V. = before the treatment; V = after the treatment

EXAMPLES 26–28

According to the preceding examples three copolymerization tests were carried out by letting aminoalane be replaced by polyiminoalane. The conditions and the results are reported in table 4.

TABLE 4

Ethylene-butadiene copolymerization tests by the ternary catalyst systems: OVCl₃—AlEtCl₂-Polyiminoalane (PIA) (the other experimental conditions were equal to the one of table 3)

| Tests | Catalyst OVCl₃ mmoles | PIACl⁽⁴⁾ mmoles | AlEtCl₂ mmoles | T°C | g | I.R. Analysis⁽¹⁾ $D_{10.35\mu}$ $D_{13.90\mu}$ | [η] | N.V. | %gel⁽³⁾ V. |
|---|---|---|---|---|---|---|---|---|---|
| 26 | 1 | 1 | 8 | 16 + 39 | 55 | 0.1 | 1.99 | 1 | 7.4 |
| 27 | 1 | 2 | 8 | 16 + 25 | 47 | 0.27 | n.d.⁽²⁾ | 18.3 | 41.6 |
| 28 | 1 | 3 | 8 | 16 | 16 | 0.4 | 3.20 | 0.8 | 55.7 |

⁽¹⁾Determination in deculine at 135°C
⁽²⁾[η] was not determined because of the gel presence
⁽³⁾Cross-linking tests by sulphur base recipes: N.V. = untreated polymer; V = treated polymer
⁽⁴⁾PIACl means a poly-N, isopropyliminoalane containing chlorine atoms; the chemical analysis thereof showed N/Al = 098, H active/Al = 0.97, Cl/Al = 0.16

What we claim is:

1. Process for the preparation of ethylene-butadiene copolymers containing from 0.1 to 95% by moles of butadiene units, wherein the polymerization reaction is carried out in the presence of a ternary catalyst system consisting essentially of
   a. vanadium or vanadyl chloride
   b. an aluminum compound represented by the formula AlR$_x$X$_{3-x}$ wherein R is alkyl, aryl, alicyclic or hydrogen, X is a halogen and $1 \leq x \leq 2$, and c. an aluminum compound containing aluminum-nitrogen bonds selected from the groups consisting of:

aluminum triamides having the general formula $Al(NR_2)_3$ wherein R has the aforesaid meaning;
$AlH_x(NR_2)_{3-x}$ wherein R and $x$ have the aforesaid meanings;
aluminum polymeric compounds having the formula

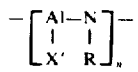

wherein R is a hydrocarbon radical selected from the aforementioned ones, X' is hydrogen or halogen; the halogen atom number is 0 or is lower than $n$, the balance to $n$ being constituted by hydrogen atoms; $n$ is from 2 to 50.

2. Process for the preparation of ethylene-butadiene copolymers according to claim 1, wherein the reaction is carried out at a molar ratio between the aluminum compound containing Al—N bonds and the vanadium compound higher than 0.1.

3. Process for the preparation of ethylene-butadiene copolymers according to claim 1, wherein the reaction is carried out at a molar ratio between the aluminum alkyl-halide and the vanadium compound higher than 0.5.

4. Process for the preparation of ethylene butadiene copolymers according to claim 1, wherein the aluminum-triamide is aluminum trisdialkyl amide.

5. Process for the preparation of ethylene-butadiene copolymers according to claim 1, wherein the reaction is carried out at a temperature in the range from $-30°$ to $+150°C$.

6. Process for the preparation of ethylene-butadiene copolymers according to claim 1, wherein the reaction is carried out at a total pressure in the range from 1 to 150 Kg/cm$^2$.

7. Process for the preparation of ethylene-butadiene copolymers according to claim 1, wherein the reaction is carried out in the presence of a solvent selected from the group consisting of aliphatic, aromatic and alicyclic hydrocarbons.

* * * * *

UNITED STATES PATENT AND TRADEMARK OFFICE
CERTIFICATE OF CORRECTION

PATENT NO. : 3,901,862
DATED : August 26, 1975
INVENTOR(S) : Salvatore Cucinella and Alessandro Mazzei It is certified that error appears in the above-identified patent and that said Letters Patent are hereby corrected as shown below:

Table 1, Column 2 under heading "Reaction vessel",

"Autoclave", "ht. 2" should read --lt. 2--.

Table 1, Column 8 sub-heading "Type" (under "Cocatalyst"), last entry "AlEtCl$_2$" should read --AlEt$_2$Cl--.

Table 4, footnote (2) should read --[$\eta$]--.

Signed and Sealed this eleventh Day of May 1976

[SEAL]

Attest:

RUTH C. MASON
Attesting Officer

C. MARSHALL DANN
Commissioner of Patents and Trademarks